United States Patent
Hong et al.

(10) Patent No.: US 8,699,517 B2
(45) Date of Patent: Apr. 15, 2014

(54) DUAL WIFI APPARATUS FOR WIRELESS INTERNET AND WIRELESS INTERNET SYSTEM USING THE SAME

(75) Inventors: Jun-Pyo Hong, Seoul (KR); Seung-Hyun Oh, Yongin (KR); Woo-Youn Juong, Gwangmyeong (KR)

(73) Assignee: LG Uplus Corp. (KR)

( * ) Notice: Subject to any disclaimer, the term of this patent is extended or adjusted under 35 U.S.C. 154(b) by 47 days.

(21) Appl. No.: 13/469,307

(22) Filed: May 11, 2012

(65) Prior Publication Data

US 2013/0010773 A1 Jan. 10, 2013

(30) Foreign Application Priority Data

Jul. 5, 2011 (KR) .................. 10-2011-0066215

(51) Int. Cl.
*H04J 3/22* (2006.01)

(52) U.S. Cl.
USPC .................. 370/466; 370/229; 370/339

(58) Field of Classification Search
USPC ......... 370/229, 230, 310, 338, 339, 359, 419, 370/465, 466
See application file for complete search history.

(56) References Cited

U.S. PATENT DOCUMENTS

| | | | | |
|---|---|---|---|---|
| 7,808,933 B2* | 10/2010 | Lee et al. | | 370/279 |
| 8,175,459 B2* | 5/2012 | Thelen et al. | | 398/115 |
| 8,428,081 B2* | 4/2013 | Diab et al. | | 370/464 |
| 2004/0123322 A1* | 6/2004 | Erkocevic et al. | | 725/81 |
| 2005/0034159 A1* | 2/2005 | Ophir et al. | | 725/78 |
| 2006/0218594 A1* | 9/2006 | Wu et al. | | 725/74 |
| 2008/0146146 A1* | 6/2008 | Binder et al. | | 455/20 |
| 2008/0279166 A1* | 11/2008 | Carty et al. | | 370/338 |
| 2010/0075611 A1* | 3/2010 | Budampati et al. | | 455/67.11 |
| 2011/0002245 A1* | 1/2011 | Wall et al. | | 370/297 |
| 2012/0066724 A1* | 3/2012 | Zussman | | 725/65 |
| 2012/0257585 A1* | 10/2012 | Sydor et al. | | 370/329 |
| 2013/0044585 A1* | 2/2013 | Kong et al. | | 370/216 |

* cited by examiner

*Primary Examiner* — Kwang B Yao
*Assistant Examiner* — Nguyen Ngo
(74) *Attorney, Agent, or Firm* — Cantor Colburn LLP

(57) ABSTRACT

A dual wireless fidelity (WiFi) apparatus for wireless Internet that may perform installation, maintenance, management, or the like of a WiFi access point (AP) by using a mobile communication relay system more efficiently, and a wireless Internet system using the dual WiFi apparatus for wireless Internet. The dual WiFi apparatus includes: a signal inputting unit comprising a plurality of input ports for inputting a plurality of mobile communication signals, respectively, and an input port for inputting an Ethernet signal; a signal converting unit for converting the inputted Ethernet signal into a plurality of WiFi signals; a signal coupling unit for coupling the plurality of inputted mobile communication signals to the plurality of WiFi signals converted by the signal converting unit, respectively; and a signal outputting unit for outputting a plurality of coupled signals coupled by the signal coupling unit through a plurality of output ports, respectively.

20 Claims, 5 Drawing Sheets

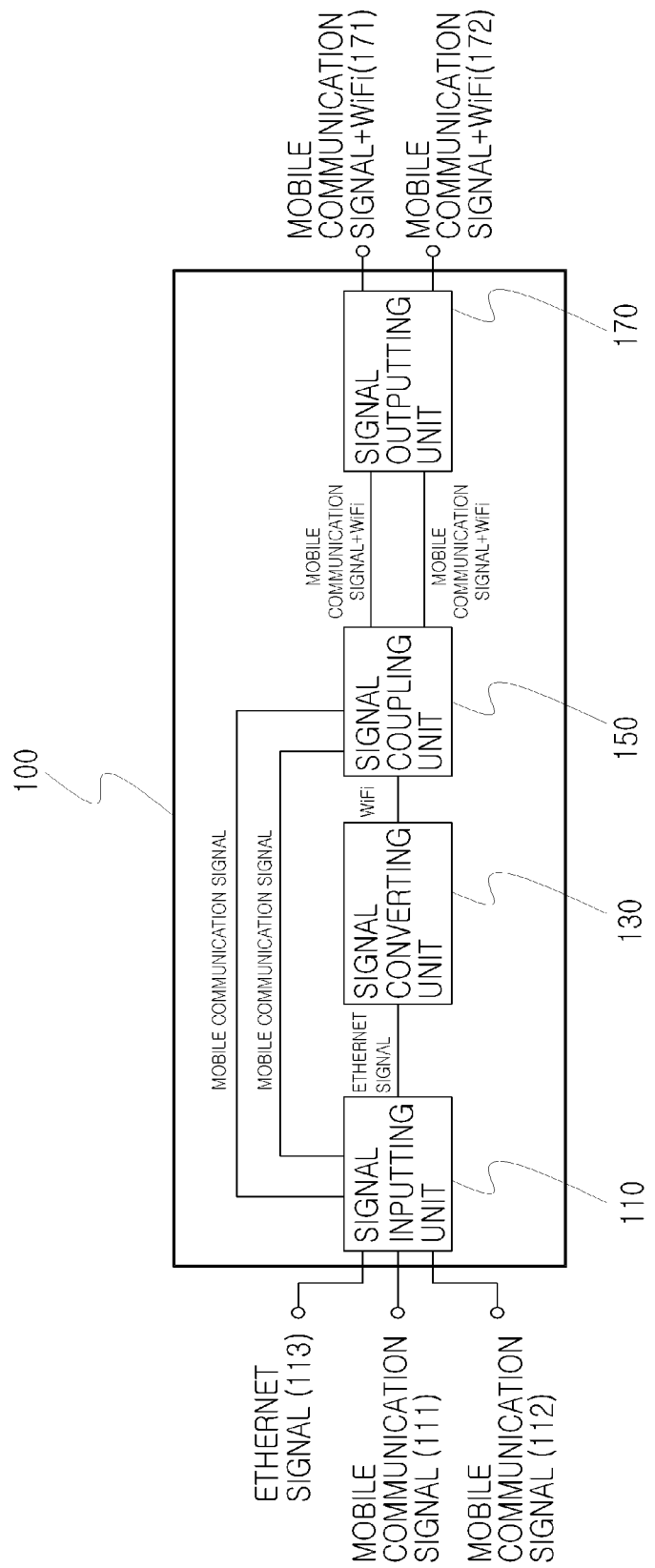

DUAL WIFI APPARATUS FOR WIRELESS INTERNET AND WIRELESS INTERNET SYSTEM USING THE SAME

CROSS-REFERENCE TO RELATED PATENT APPLICATION

This application claims the benefit of Korean Patent Application No. 10-2011-0066215, Jul. 5, 2011, in the Korean Intellectual Property Office, the disclosure of which is incorporated herein in its entirety by reference.

BACKGROUND OF THE INVENTION

1. Field of the Invention

The present invention relates to a wireless Internet system, and more particularly, to a dual wireless fidelity (WiFi) apparatus for wireless Internet that may perform installation, maintenance, management, or the like by using a mobile communication relay system more efficiently, and a wireless Internet system using the WiFi apparatus for wireless Internet.

2. Description of the Related Art

In general, wireless Internet service includes a wireless local area network (LAN), wireless broadband (Wibro) as portable Internet, evolution data optimized CDMA2000 (EV-DO), and the like.

A wireless LAN among them is called a wireless fidelity (WiFi) or wireless LAN that complies with the Institute of Electrical and Electronic Engineers (IEEE) 802.11x 1999 standards. In the wireless LAN, an access point (AP) is connected to a wired LAN and a mobile terminal, a notebook computer, or the like is wirelessly connected to the AP and is connected to the Internet. The IEEE 802 standards refer to a series of LAN connections developed by the IEEE 802 committee that promote standardization of a computer communication network and protocols defined in the IEEE 802 standards. A reference model of the protocols defined in the IEEE 802 standards is based on a hierarchy concept of an open system interconnection (OSI) reference model, and two lower layers among 7 layers of the OSI reference model are usually standardized.

Wireless LAN service uses an industrial scientific and medical equipment (ISM) band (unpermitted band) of 2.400 to 2.483 GHz that complies with the IEEE 802.11b/g international standards; thus, wireless LAN service has frequency interference with other communication service and a narrow coverage due to low output.

Although wireless LAN service having a 2.4 GHz band is localized indoors and at a hotspot with a narrow coverage, such wireless LAN systems may be easily interlocked with the Internet and are produced and supplied with a system specification that complies with the international standards. Thus, the use of wireless LAN systems has been spread owing to advantages of low price, high-speed data transmission, and the like, and at present, the IEEE 802.11g standards and the IEEE 802.11n standards have been proposed for higher speed data transmission.

In addition, there are the IEEE 802.11a standards that use a 2.3-2.5 GHz band and have a transmission speed of 54 Mbps. That is, in the wireless LAN connection using a 2.4 GHz band, high-speed data transmission can be performed using an industrial, scientific and medical (ISM) band. However, for example, a service area is limited to indoors and the hotspot due to a narrow coverage of several tens of meter radius and frequency interference. In addition, the wireless LAN connection having a 2.3 GHz band uses a permitted band for portable Internet service; thus, high-speed data transmission can be performed while maintaining a wider coverage without some frequency interference and output limitations.

Such wireless LAN service is mainly provided in large-scaled book stores, fast food stores, coffee shops, airports, universities, and the like.

As the number of smart phone users increases and installation of WiFi as a wireless LAN is increasing, a large number of WiFi APs needs to be installed, and efficiency in conveniences of WiFi installation and maintenance, a reduction in establishment cost, or the like is required. That is, in the related art, a plurality of WiFi installations has been provided to obtain a coverage of a desired area.

In addition, WiFi uses a common frequency and thus has output limitations, and the number of smart phone subscribers increases, and more WiFi installations are provided, which cause difficulties in maintenance, management, and installation.

SUMMARY OF THE INVENTION

The present invention provides a dual wireless fidelity (WiFi) apparatus for wireless Internet that may perform installation, maintenance, management, or the like of a WiFi access point (AP) by using a mobile communication relay system more efficiently, and a wireless Internet system using the dual WiFi apparatus for wireless Internet.

According to an aspect of the present invention, there is provided a dual wireless fidelity (WiFi) apparatus for wireless Internet, the dual WiFi apparatus including: a signal inputting unit including a plurality of input ports for inputting a plurality of mobile communication signals, respectively, and an input port for inputting an Ethernet signal; a signal converting unit for converting the inputted Ethernet signal into a plurality of WiFi signals; a signal coupling unit for coupling the plurality of inputted mobile communication signals to the plurality of WiFi signals converted by the signal converting unit, respectively; and a signal outputting unit for outputting a plurality of coupled signals coupled by the signal coupling unit through a plurality of output ports, respectively.

In one embodiment, the signal converting unit may include at least two WiFi modules having single input, single output (SISO) in accordance with the IEEE 802.11g standards. In another embodiment, the signal converting unit may include at least one WiFi module having multiple input, multiple output (MIMO) in accordance with the IEEE 802.11n standards. Each of the plurality of mobile communication signals may include at least one selected from the group consisting of a second generation (2G) mobile communication signal, a third generation (3G) mobile communication signal, and a fourth generation (4G) mobile communication signal.

According to another aspect of the present invention, there is provided a wireless Internet system using a dual wireless fidelity (WiFi) apparatus for wireless Internet, the wireless Internet system including: the dual WiFi apparatus including a signal inputting unit including a plurality of input ports for inputting a plurality of mobile communication signals outputted from a divider of a mobile communication relay device, respectively, and an input port for inputting an Ethernet signal, a signal converting unit for converting the inputted Ethernet signal into at least a plurality of WiFi signals, a signal coupling unit for coupling the plurality of inputted mobile communication signals to the plurality of WiFi signals converted by the signal converting unit, respectively, and a signal outputting unit for outputting a plurality of coupled signals coupled by the signal coupling unit through a plurality of output ports, respectively; a coaxial cable having a predetermined length for transmitting a coupled signal outputted from each of the plurality of output ports; and an antenna installed at an end of the coaxial cable and for radiating the coupled signal.

In one embodiment, the signal converting unit of the dual WiFi apparatus may include at least two WiFi modules having single input, single output (SISO) in accordance with the IEEE 802.11g standards. In another embodiment, the signal converting unit of the dual WiFi apparatus may include at least one WiFi module having multiple input, multiple output (MIMO) in accordance with the IEEE 802.11n standards. Each of the plurality of mobile communication signals may include at least one selected from the group consisting of a second generation (2G) mobile communication signal, a third generation (3G) mobile communication signal, and a fourth generation (4G) mobile communication signal.

BRIEF DESCRIPTION OF THE DRAWINGS

The above and other features and advantages of the present invention will become more apparent by describing in detail exemplary embodiments thereof with reference to the attached drawings in which:

FIG. 1 is a block diagram of a structure of a dual wireless fidelity (WiFi) apparatus for wireless Internet according to an embodiment of the present invention;

DETAILED DESCRIPTION OF THE INVENTION

Figure 2A:
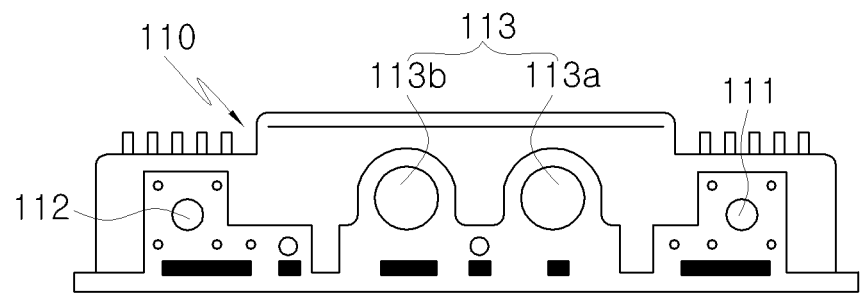
FIGS. 2A through 2C are perspective views of an external structure of the dual WiFi apparatus for wireless Internet illustrated in FIG. 1.

The present invention will now be described more fully with reference to the accompanying drawings, in which exemplary embodiments of the invention are shown. Like reference numerals in the drawings denote like elements. In the description of the present invention, if it is determined that a detailed description of commonly-used technologies or structures related to the invention may unnecessarily obscure the subject matter of the invention, the detailed description will be omitted.

FIG. 1 is a block diagram of a structure of a dual wireless fidelity (WiFi) apparatus for wireless Internet according to an embodiment of the present invention. Referring to FIG. 1, the dual WiFi apparatus for wireless Internet according to the present embodiment may include a signal inputting unit 110, a signal converting unit 130, a signal coupling unit 150, and a signal outputting unit 170.

The signal inputting unit 110 according to the present embodiment may include a first input port 111 for inputting a first mobile communication signal, a second input port 112 for inputting a second mobile communication signal, and a third input port 113 for inputting an Ethernet signal. In the present embodiment, the signal inputting unit 110 includes two input ports 111 and 112 for inputting mobile communication signals. However, aspects of the present invention are not limited thereto, and the signal inputting unit 110 may include a plurality of input ports for inputting a plurality of mobile communication signals, respectively.

In the present embodiment, the first mobile communication signal and the second mobile communication signal are coexistent, different generation signals, for example. For example, the first mobile communication signal may be a second generation (2G) signal, and the second mobile communication signal may be a third generation (3G) signal, or a fourth generation (4G) signal. As another example, the first mobile communication signal and the second mobile communication signal as the same signal split by a divider 330 of a mobile communication relay device 310 may be a single signal having the same generation, for example, one signal among a 2G signal, a 3G signal, and a 4G signal, or a coupled signal between different generations, for example, a 2G+3G signal, a 2G+4G signal, or the like. In the present embodiment, for convenience of explanation, the first mobile communication signal and the second mobile communication signal as the same signal are a 2G+4G signal.

The signal converting unit 130 according to the present embodiment converts the Ethernet signal inputted through the third input port 113 of the signal inputting unit 110 into at least two WiFi signals, for example, to convert the Ethernet signal into a WiFi signal to output at least two WiFi signals. In one embodiment, the signal converting unit 130 may include two or more coupled WiFi modules (or AP modules) having single input, single output (SISO) in accordance with the IEEE 802.11g standards. Alternatively, in another embodiment, the signal converting unit 130 may include one WiFi module or one or more coupled WiFi modules having multiple input, multiple output (MIMO) in accordance with the IEEE 802.11n standards. In the present embodiment, the signal converting unit 130 may include two WiFi modules in accordance with the IEEE 802.11g standards or one WiFi module in accordance with the IEEE 802.11n standards.

The signal coupling unit 150 according to the present embodiment couples a plurality of mobile communication signals inputted by the signal inputting unit 110 to a plurality of WiFi signals converted by the signal converting unit 130, respectively, in order to generate and output a plurality of coupled signals. For example, the signal coupling unit 150 couples the first and second mobile communication signals inputted through the first input port 111 and the second input port 112 of the signal inputting unit 110 to two WiFi signals converted by the signal converting unit 130 in order to generate two 2G+4G+WiFi coupled signals, for example.

The signal outputting unit 170 according to the present embodiment outputs the plurality of coupled signals coupled by the signal coupling unit 150 through a plurality of output ports, respectively. For example, the signal outputting unit 170 may output two 2G+4G+WiFi coupled signals coupled by the signal coupling unit 150 through two, first and second output ports 171 and 172, respectively.

Figure 2B:
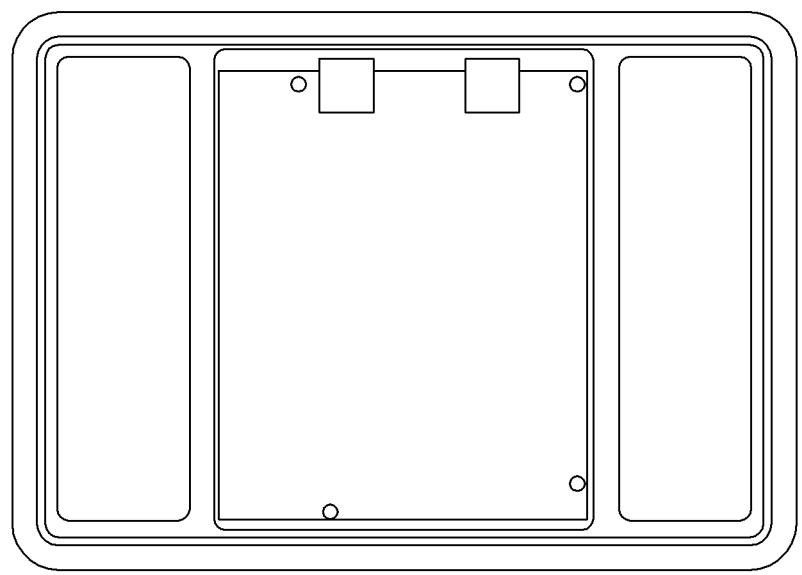
Figure 2C:
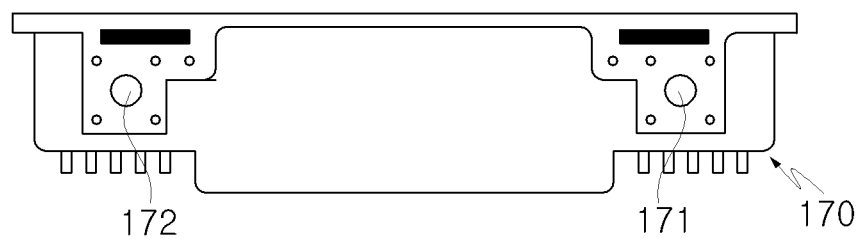

FIGS. 2A through 2C are perspective views of an external structure of the dual WiFi apparatus 100 for wireless Internet illustrated in FIG. 1. FIG. 2A is one side view of the dual WiFi apparatus 100 illustrated in FIG. 1, and FIG. 2B is a plane view of the dual WiFi apparatus 100 illustrated in FIG. 1, and FIG. 2C is the other side view of the dual WiFi apparatus 100 illustrated in FIG. 1.

Referring to FIG. 2A, on one side of the dual WiFi apparatus 100, the first input port 111, the second input port 112, and the third input port 113 for inputting an Ethernet signal of the signal inputting unit 110 are disposed. In the present embodiment, the third input port 113 may include an input port 113a for inputting a power+Ethernet signal and an input port 113b for inputting the Ethernet signal.

Referring to FIG. 2C, on the other side of the dual WiFi apparatus 100, a first output port 171 and a second output port 172 of the signal outputting unit 170 are disposed.

Although the elements 110, 130, 150, and 170 of the dual WiFi apparatus 100 described with reference to FIGS. 1 and 2A through 2C have been described for forward signal processing in the order of the signal inputting unit 110->the signal converting unit 130->the signal coupling unit 150->the signal outputting unit 170, backward signal processing in an opposite direction to the forward direction may also be performed. For example, when backward signal processing is performed, the signal outputting unit 170 may input at least one of a WiFi signal and a mobile communication signal, and when the inputted signal is a WiFi+mobile communication coupled signal, the signal coupling unit 150 may split the inputted signal into the WiFi signal and the mobile communication signal, and the signal converting unit 130 may convert the split WiFi signal into the Ethernet signal, and the signal inputting unit 110 may output the converted Ethernet signal and the split mobile communication signal through the first through third input ports 111, 112, and 113.

Next, an example of an operation of the dual WiFi apparatus 100 according to the current embodiment of the present invention will be described.

First, when first and second 2G+4G mobile communication signals are inputted to the first and second input ports 111 and 112 of the signal inputting unit 110 and the Ethernet signal is inputted to the third input port 113, the signal converting unit 130 converts the inputted Ethernet signal into the WiFi signal and outputs at least two, first and second WiFi signals.

Subsequently, the signal coupling unit 150 couples the first and second WiFi signals outputted from the signal converting unit 130 to the first and second 2G+4G mobile communication signals inputted by the signal inputting unit 110 in order to generate first and second 2G+4G+WiFi coupled signals, and the signal outputting unit 170 outputs the first and second 2G+4G+WiFi coupled signals to the first and second output ports 171 and 172, respectively.

Figure 3:
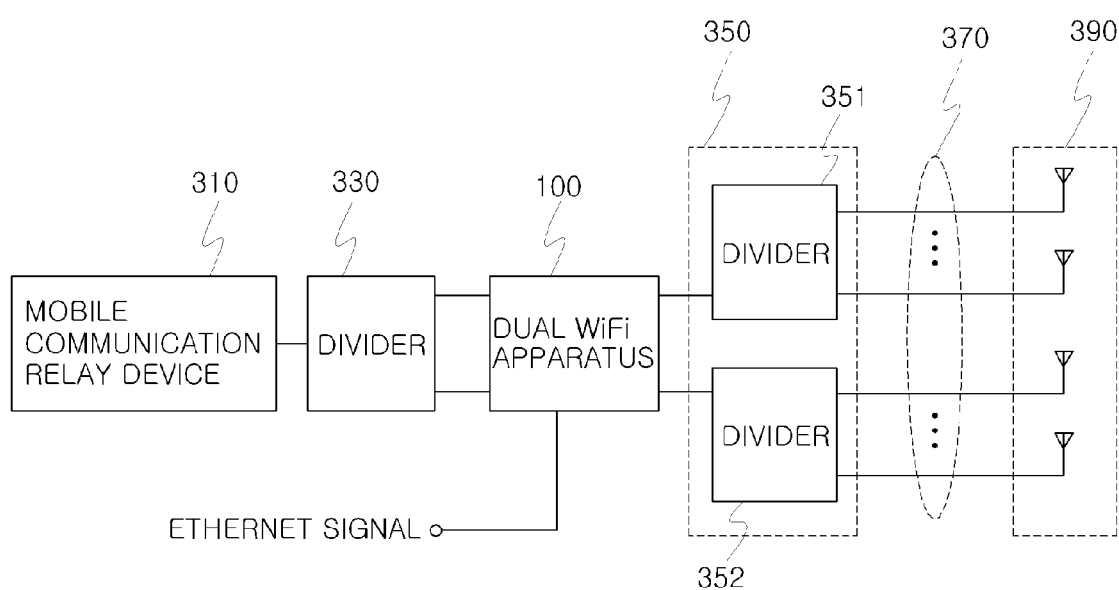
FIG. 3 is a block diagram of a structure of a wireless Internet system using a dual WiFi apparatus for wireless Internet, according to an embodiment of the present invention.

FIG. 3 is a block diagram of a structure of a wireless Internet system using a dual WiFi apparatus for wireless Internet, according to an embodiment of the present invention. The wireless Internet system according to the present embodiment may include a mobile communication relay device 310, a divider 330, a dual WiFi apparatus 100, a divider 351, a coaxial cable 370, and an antenna 390.

The mobile communication relay device 310 according to the present embodiment is a device for increasing a coverage of a terminal device, such as a base station of a mobile communication network and is the same as an existing mobile communication relay device and thus, the detailed description thereof will be omitted.

The divider 330 according to the present embodiment splits a mobile communication signal outputted from the mobile communication relay device 310 into a plurality of mobile communication signals. In the present embodiment, the divider 330 splits the mobile communication signal outputted from the mobile communication relay device 310 into first and second mobile communication signals.

The dual WiFi apparatus 100 according to the present embodiment is the dual WiFi apparatus 100 illustrated in FIG. 1. For example, the dual WiFi apparatus 100 may include a signal inputting unit 110 including first and second input ports 111 and 112 for inputting first and second mobile communication signals outputted from the divider 330 of the mobile communication relay device 310, respectively, and a third input port 113 for inputting an Ethernet signal via unshielded twisted pair (UTP) cables of the LAN, a signal converting unit 130 for converting the Ethernet signal inputted through the third input port 113 into at least two WiFi signals, a signal coupling unit 150 for coupling the first and second mobile communication signals inputted through the first and second input ports 111 and 112 to two WiFi signals converted by the signal converting unit 130, and a signal outputting unit 170 for outputting two coupled signals coupled by the signal coupling unit 150 to two, first and second output ports 171 and 172. The more detailed description thereof will be referred to FIGS. 1 and 2A through 2C described above.

The divider 350 according to the present embodiment may include two dividers 351 and 352 for inputting two mobile communication+WiFi coupled signals outputted from the first and second output ports 171 and 172 of the signal outputting unit 170 of the dual WiFi apparatus 100, respectively, and the dividers 351 and 352 each split each inputted mobile communication+WiFi coupled signal into a plurality of signals and outputs the signals.

The coaxial cable 370 according to the present embodiment includes a plurality of cables that extend a plurality of mobile communication+WiFi coupled signals outputted from the dividers 351 and 352 by a predetermined length and transmit the plurality of communication+WiFi coupled signals.

The antenna 390 according to the present embodiment is installed at an end of each coaxial cable 370 and radiates the plurality of mobile communication+WiFi coupled signals transmitted via the plurality of coaxial cables 370 to the outside.

In another embodiment, the divider 350 may be detached from the wireless Internet system, and two mobile communication+WiFi coupled signals outputted from the dual WiFi apparatus 200 may be transmitted via each coaxial cable 370 having a predetermined length and may be radiated via each antenna 390 to the outside.

Although the elements 310, 330, 100, 350, 370, and 390 of the wireless Internet system illustrated in FIG. 3 have been described for forward, i.e., a direction towards a terminal from a communication system, signal processing in the order of the mobile communication relay device 310->the divider 330->the dual WiFi apparatus 100->the divider 350->the coaxial cable 370->the antenna 390, backward that is opposite to forward, i.e., a direction towards the communication system from the terminal, signal processing may also be performed.

Next, an example of an operation of the wireless Internet system using a dual WiFi apparatus for wireless Internet, according to the current embodiment of the present invention will be described.

First, a 2G+4G mobile communication signal, for example, outputted from the mobile communication relay device 310 is split by the divider 330 into a plurality of mobile communication signals, for example, a first 2G+4G mobile communication signal and a second 2G+4G mobile communication signal.

Subsequently, when the first and second 2G+4G mobile communication signals outputted from the divider 330 are inputted to the dual WiFi apparatus 100 and the Ethernet signal is inputted to the dual WiFi apparatus 200 via UTP cables of the LAN, the dual WiFi apparatus 100 converts the inputted Ethernet signal into a plurality of WiFi signals, for example, first and second WiFi signals, and couples the converted first and second WiFi signals to the inputted first and second 2G+4G mobile communication signals, respectively, to generate and output first and second 2G+4G+WiFi coupled signals.

Subsequently, the dividers 351 and 352 each split the first and second 2G+4G+WiFi coupled signals outputted from the dual WiFi apparatus 100 into a plurality of 2G+4G+WiFi coupled signals, and each of the 2G+4G+WiFi coupled signals is transmitted to a coverage area via each coaxial cable 370 and then is radiated from each antenna 390.

Figure 4:
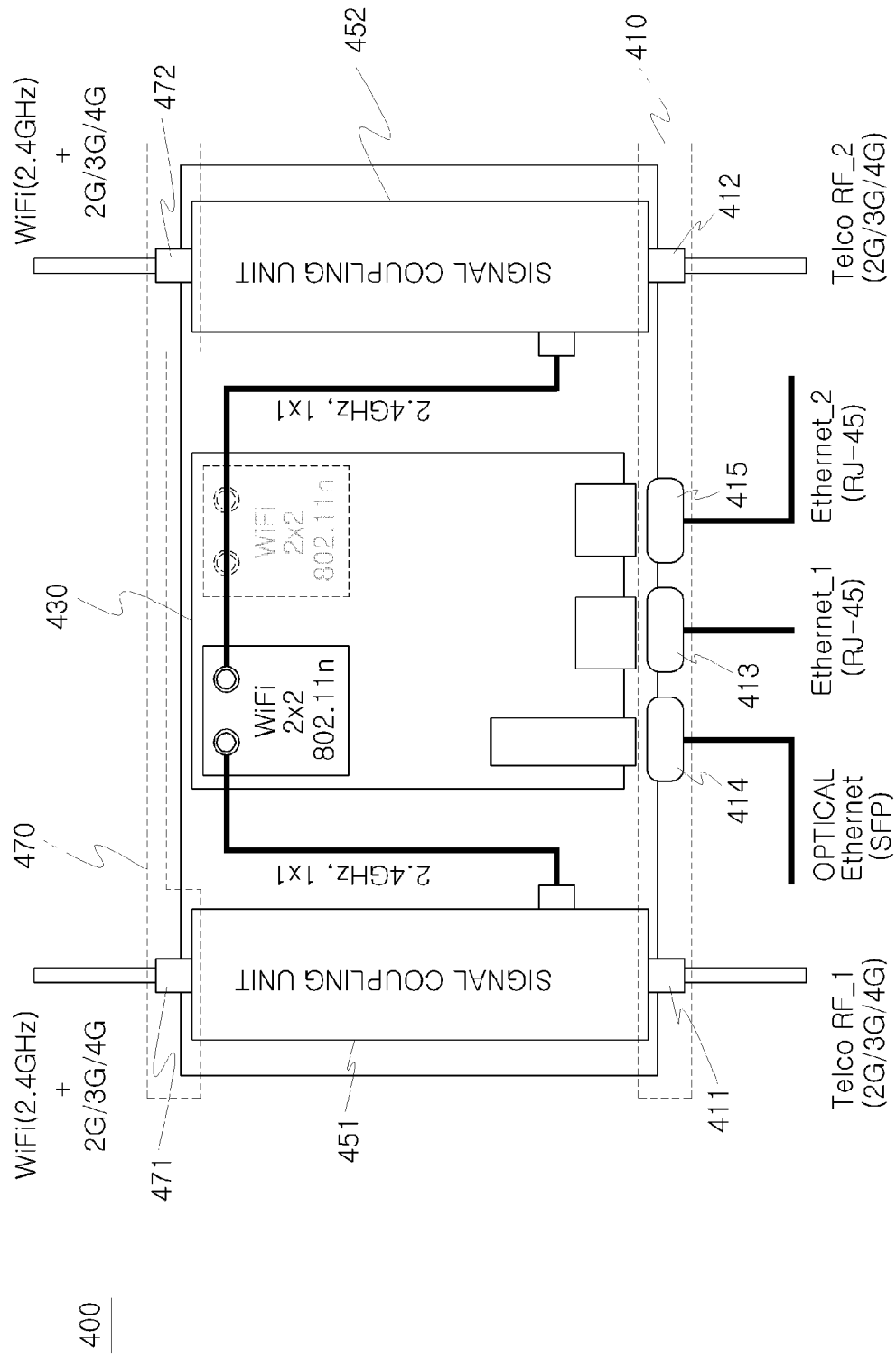
FIG. 4 is a block diagram of a structure of a dual WiFi apparatus for wireless Internet according to another embodiment of the present invention.

FIG. 4 is a block diagram of a structure of a dual WiFi apparatus 400 for wireless Internet according to another embodiment of the present invention.

Referring to FIG. 4, the dual WiFi apparatus 400 for wireless Internet may include, a signal inputting unit 410, a signal converting unit 430, signal coupling units 451 and 452, and a signal outputting unit 470.

The signal inputting unit 410 may include first and second input ports 411 and 412 for inputting first and second 2G/3G/4G mobile communication signals, a third input port 413 for inputting an Ethernet signal Ethernet_1, a fourth input port 414 for inputting an optical Ethernet signal through connection to optical cables, and an output port 415 for outputting an Ethernet signal Ethernet_2. The signal inputting unit 410 further includes the fourth input port 414 and the output port 415, unlike in the signal inputting unit 110 of FIG. 1. The output port 415 as an Ethernet signal outputting unit transports the Ethernet signal Ethernet_1 inputted through the third input port 413 or the optical Ethernet signal inputted through the fourth input port 414 for cascade connection, to another place. In the present embodiment, 2G/3G/4G represents a mobile communication signal obtained by coupling one or more 2G, 3G, and 4G signals.

The signal converting unit 430 includes one WiFi module (WiFi 2×2 802.11n) having MIMO in accordance with the IEEE 802.11n standards and has a function that is the same as or similar to the function of the signal converting unit 130 of FIG. 1.

The signal coupling units 451 and 452 each couple the first and second 2G/3G/4G mobile communication signals inputted through the first and second input ports 411 and 412 to two 2.4 GHz WiFi signals outputted from the signal converting unit 430 to generate two 2G/3G/4G+WiFi coupled signals and may include a band pass filter (BPF) and a diplexer, for example.

The signal outputting unit 470 according to the present embodiment includes first and second output ports 471 and 472 for outputting two 2G/3G/4G+WiFi coupled signals coupled by the signal coupling units 451 and 452, respectively.

The dual WiFi apparatus 400 of FIG. 4 may be replaced with the dual WiFi apparatus 100 of FIG. 1 in the wireless Internet system using the dual WiFi apparatus of FIG. 3.

Figure 5:
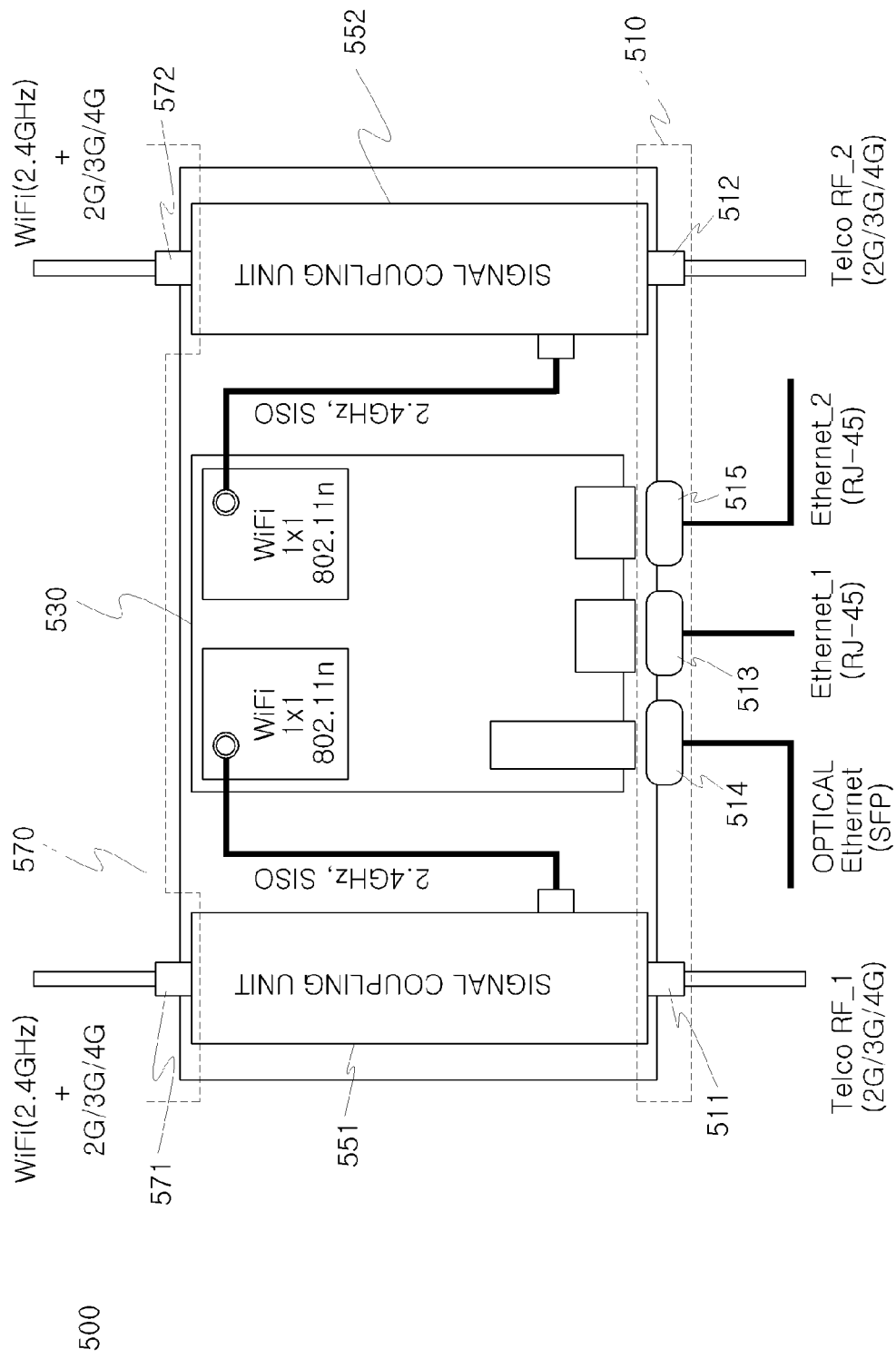
FIG. 5 a block diagram of a structure of a dual WiFi apparatus for wireless Internet according to another embodiment of the present invention.

FIG. 5 is a block diagram of a structure of a dual WiFi apparatus 500 for wireless Internet according to another embodiment of the present invention.

Referring to FIG. 5, the dual WiFi apparatus 500 for wireless Internet may include a signal inputting unit 510, a signal converting unit 530, signal coupling units 551 and 552, and a signal outputting unit 570.

The signal inputting unit 510 may include first and second input ports 511 and 512 for inputting first and second 2G/3G/4G mobile communication signals, respectively, a third input port 513 for inputting an Ethernet signal Ethernet_1, a fourth input port 514 for inputting an optical Ethernet signal through connection to optical cables, and an output port 515 for outputting an Ethernet signal Ethernet_2. The signal inputting unit 510 is the same as the signal inputting unit 410 of FIG. 4.

The signal converting unit 530 includes two WiFi modules in which each WiFi module (WiFi 1×1 802.11n) has SISO in accordance with the IEEE 802.11n standards. Therefore the signal converting unit 530 has a function that is the same as or similar to the function of the signal converting unit 430 of FIG. 4.

The signal coupling units 551 and 552 couple the first and second 2G/3G/4G mobile communication signals inputted through the first and second input ports 511 and 512 to two 2.4 GHz WiFi signals outputted from the signal converting unit 530 to generate two 2G/3G/4G+WiFi coupled signals and may include a band pass filter (BPF) and a diplexer, for example. The signal coupling units 551 and 552 are the same as the signal coupling units 451 and 452 of FIG. 4.

The signal outputting unit 570 according to the present embodiment includes first and second output ports 571 and 572 for outputting two 2G/3G/4G+WiFi coupled signals coupled by the signal coupling units 551 and 552, respectively. The signal outputting unit 570 is the same as the signal outputting unit 470 of FIG. 4.

The dual WiFi apparatus 500 of FIG. 5 may be replaced with the dual WiFi apparatus 100 illustrated in FIG. 1 in the wireless Internet system using the dual WiFi apparatus of FIG. 3.

As shown in FIG. 2A through 2C, 4, and 5, the input ports of the signal inputting units 110, 410, 510 and the output ports of the signal outputting units 170, 470, 570 are respectively disposed on two opposite sides of the dual WiFi apparatus 100, 400, or 500 according to embodiments of the present invention.

Thus, as shown in FIG. 3, by installing the dual WiFi apparatus 100, 400, or 500 after the divider 330 (existing general divider usually splits a coupled signal into two) installed in a building, WiFi signals may be easily transmitted using an existing mobile communication network.

As described above, according to the present invention, since a user uses an allocated frequency in a mobile communication relay device, there are no limitations in output of the mobile communication relay device. However, since, when a common frequency, as in WiFi, is used, there are output limitations, a dual WiFi apparatus with two allowed maximum outputs is installed after a divider of an output of the mobile communication relay device so that an installation point of WiFi may be minimized. In addition, WiFi signals are transmitted together with mobile communication signals by utilizing a coaxial cable of an existing mobile communication relay system so that installation of UTP cables may be minimized and installation, maintenance, and management, or the like of a WiFi AP (or WiFi module) may be more efficiently performed.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A dual wireless fidelity (WiFi) apparatus for transmitting WiFi signals by using an existing mobile communication relay system that transmits mobile communication signals, the dual WiFi apparatus comprising:
   a signal inputting unit comprising a plurality of input ports for inputting a plurality of mobile communication signals, respectively, and an input port for inputting an Ethernet signal, the plurality of input ports for connecting to the mobile communication relay system to receive the plurality of mobile communication signals from the mobile communication relay system;
a signal converting unit for converting the inputted Ethernet signal into a plurality of WiFi signals;
a signal coupling unit for coupling the plurality of inputted mobile communication signals to the plurality of WiFi signals converted by the signal converting unit, respectively; and
a signal outputting unit for outputting a plurality of coupled signals coupled by the signal coupling unit through a plurality of output ports, respectively, the plurality of output ports for connecting to the mobile communication relay system in order for the mobile communication relay system to transmit the plurality of coupled signals.

2. The dual WiFi apparatus of claim 1, wherein the signal converting unit comprises at least two WiFi modules having single input, single output (SISO) in accordance with the IEEE 802.11g standards.

3. The dual WiFi apparatus of claim 1, wherein each of the plurality of mobile communication signals comprises at least one selected from a group comprising a second generation (2G) mobile communication signal, a third generation (3G) mobile communication signal, and a fourth generation (4G) mobile communication signal.

4. The dual WiFi apparatus of claim 1, wherein the signal inputting unit further comprises an input port for inputting an optical Ethernet signal.

5. The dual WiFi apparatus of claim 4, wherein the signal inputting unit further comprises an output port for outputting the inputted Ethernet signal or the inputted optical Ethernet signal.

6. The dual WiFi apparatus of claim 1, wherein the signal inputting unit comprises two input ports for inputting a plurality of mobile communication signals, and the signal outputting unit comprises two output ports, wherein the two input ports and the two output ports are disposed on two opposite sides of the dual WiFi apparatus, respectively.

7. The dual WiFi apparatus of claim 1, wherein the signal converting unit further comprises at least one WiFi module having multiple input, multiple output (MIMO).

8. A dual wireless fidelity (WiFi) apparatus for wireless Internet, the dual WiFi apparatus comprising:
a signal inputting unit comprising a plurality of input ports for inputting a plurality of mobile communication signals, respectively, and an input port for inputting an Ethernet signal;
a signal converting unit for converting the inputted Ethernet signal into a plurality of WiFi signals;
a signal coupling unit for coupling the plurality of inputted mobile communication signals to the plurality of WiFi signals converted by the signal converting unit, respectively; and
a signal outputting unit for outputting a plurality of coupled signals coupled by the signal coupling unit through a plurality of output ports, respectively,
wherein the signal converting unit comprises at least one WiFi module having multiple input, multiple output (MIMO) in accordance with the IEEE 802.11n standards.

9. The dual WiFi apparatus of claim 8, wherein each of the plurality of mobile communication signals comprises at least one selected from a group comprising a second generation (2G) mobile communication signal, a third generation (3G) mobile communication signal, and a fourth generation (4G) mobile communication signal.

10. The dual WiFi apparatus of claim 8, wherein the signal inputting unit further comprises an input port for inputting an optical Ethernet signal.

11. The dual WiFi apparatus of claim 10, wherein the signal inputting unit further comprises an output port for outputting the inputted Ethernet signal or the inputted optical Ethernet signal.

12. The dual WiFi apparatus of claim 8, wherein the signal inputting unit comprises two input ports for inputting a plurality of mobile communication signals, and the signal outputting unit comprises two output ports, wherein the two input ports and the two output ports are disposed on two opposite sides of the dual WiFi apparatus, respectively.

13. A wireless Internet system using a dual wireless fidelity (WiFi) apparatus for radiating WiFi signals by using an existing mobile communication relay device that radiates mobile communication signals, the wireless Internet system comprising:
the dual WiFi apparatus comprising:
a signal inputting unit comprising a plurality of input ports for inputting a plurality of mobile communication signals and for connecting to a divider of the mobile communication relay device to receive the plurality of mobile communication signals outputted from the divider of the mobile communication relay device, respectively, and an input port for inputting an Ethernet signal;
a signal converting unit for converting the inputted Ethernet signal into at least a plurality of WiFi signals;
a signal coupling unit for coupling the plurality of inputted mobile communication signals to the plurality of WiFi signals converted by the signal converting unit, respectively; and
a signal outputting unit for outputting a plurality of coupled signals coupled by the signal coupling unit through a plurality of output ports, respectively;
a coaxial cable having a predetermined length for transmitting a coupled signal outputted from each of the plurality of output ports; and
an antenna installed at an end of the coaxial cable and for radiating the coupled signal.

14. The wireless Internet system of claim 13, further comprising a divider for splitting a coupled signal outputted from each of the plurality of output ports into a plurality of coupled signals, wherein the coaxial cable comprises a plurality of coaxial cables corresponding to the plurality of coupled signals.

15. The wireless Internet system of claim 14, wherein the signal inputting unit of the dual WiFi apparatus further comprises an output port for outputting the inputted Ethernet signal or the inputted optical Ethernet signal.

16. The wireless Internet system of claim 13, wherein the signal converting unit of the dual WiFi apparatus comprises at least two WiFi modules having single input, single output (SISO) in accordance with the IEEE 802.11g standards.

17. The wireless Internet system of claim 13, wherein the signal converting unit of the dual WiFi apparatus comprises at least one WiFi module having multiple input, multiple output (MIMO) in accordance with the IEEE 802.11n standards.

18. The wireless Internet system of claim 13, wherein each of the plurality of mobile communication signals comprises at least one selected from the group comprising a second generation (2G) mobile communication signal, a third generation (3G) mobile communication signal, and a fourth generation (4G) mobile communication signal.

19. The wireless Internet system of claim 13, wherein the signal inputting unit of the dual WiFi apparatus further comprises an input port for inputting an optical Ethernet signal.

20. The wireless Internet system of claim 13, wherein the signal inputting unit of the dual WiFi apparatus comprises two input ports for inputting a plurality of mobile communication signals, and the signal outputting unit of the dual WiFi apparatus comprises two output ports, wherein the two input ports and the two output ports are disposed on-two opposite sides of the dual WiFi apparatus, respectively.

* * * * *